Dec. 13, 1938.  E. RUSKA  2,139,854
DEFLECTION SYSTEM FOR BRAUN TUBES
Filed April 6, 1936
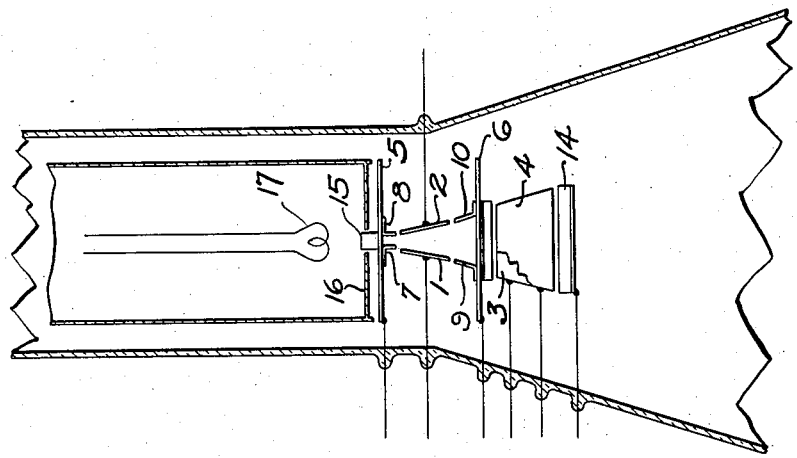
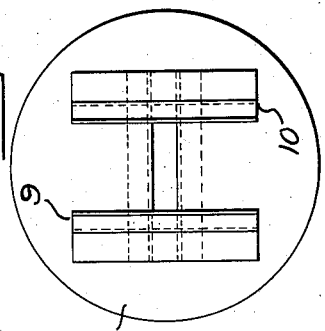
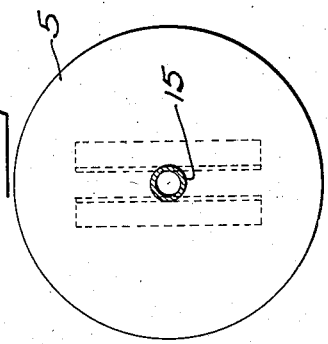
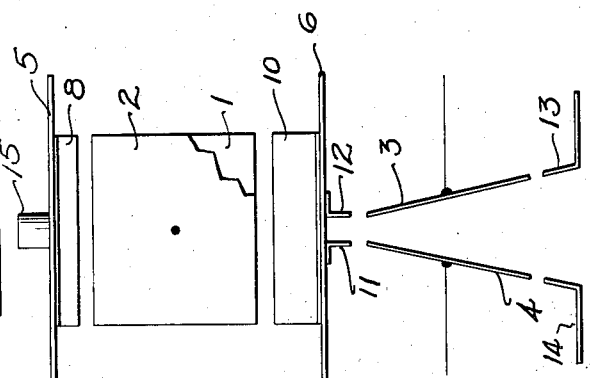
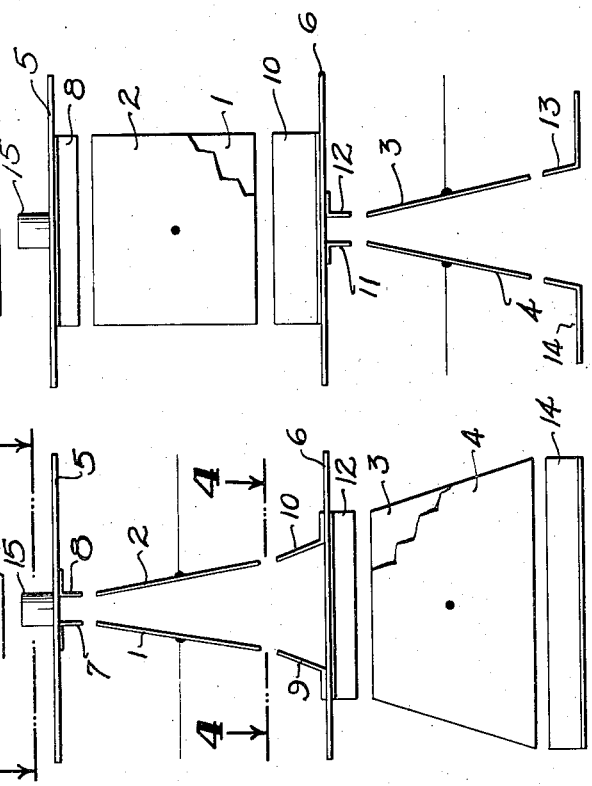

Patented Dec. 13, 1938

2,139,854

UNITED STATES PATENT OFFICE 2,139,854

DEFLECTION SYSTEM FOR BRAUN TUBES

Ernst Ruska, Berlin-Zehlendorf, Germany, assignor to the firm of Fernseh Aktiengesellschaft, Zehlendorf, near Berlin, Germany Application April 6, 1936, Serial No. 73,012
In Germany December 4, 1934

2 Claims. (Cl. 250—159)

This invention refers to electrostatic deflection systems for Braun tubes.

It is observed that, due to the electrostatic deflection of the cathode ray in Braun tubes, the focal spot on the screen will become larger and more distorted, the larger the angle of deflection.

This invention aims to decrease to a minimum this very disturbing phenomenon. Observation proves that the effect is caused by the edge fields of the deflection plates. These edge fields vary, not necessarily in only two coordinates, but at right angles to each other. This is in contrast to the deflecting field proper, which is applied between the two plates. Field forces are set up by any neighboring electrodes of rotational symmetry (in front of the first pair of deflection plates), or by the second pair of deflection plates which are arranged crosswise to the first pair. These field forces will enlarge the deflected spot, on one side of the screen, in the direction of deflection, and on the other side, in the perpendicular direction. This enlargement, which results in a blurring of the outer parts of the picture received, for instance as in television, will increase very rapidly, particularly with a large angle of deflection.

Experiments have shown that these interfering phenomena will decrease considerably (in two coordinates only) over their entire extent, if the edge fields vary in the same manner as the plate field proper. This result is attained by installing counter-electrodes on which terminates the edge field of the plates and which show, along the width of the plates, a uniform shape of cross section in the plane of deflection. Most important is that part of the electrode boundary which is pointing in the direction of the plate and the beam. The counter-electrodes should be placed as close as possible to their corresponding deflection plates, in order that the edge field will fade out rapidly (resulting in an economy of tube length). The boundaries of the counter-electrodes should be arranged parallel to the beam at the side of incidence of the system of plates. This is done in order to keep small the controllance of the edge field towards the electrodes of rotational symmetry which are more distant from the plates, or towards electrodes oriented on a different axis (second pair of plates). The boundary on the side of emergence should be arranged approximately as a continuation in line with the end of the plates at which the beam emerges. It is advisable to have projecting out as a counter-electrode, a short plate, against the corresponding deflection plate. For this purpose, one method is to provide angle pieces with a corresponding opening, on an electrode disk which is placed perpendicularly to the beam, or to bend the counter-electrode from the full electrode disk.

In most cases, the two counter-electrodes on one side of a pair of plates, will both have the same potential. The deflection plates will show, of course, varying potentials, and accordingly, as a rule, each plate has a potential different from that of the counter-electrode. On both pairs of counter-electrodes, before and after an arrangement of plates, there may or may not be the same potential. Different potentials will be required, for instance, if the response is to be made more sensitive. This would necessitate a decrease in the rate of passage through the pair of plates, compared to the rate of striking the screen. In case the rates of electronic flow are the same in both systems of plates, the counter-electrodes of all four plates (arranged between the two pairs of plates) may be attached to a common electrode disk which is placed perpendicularly to the beam. There is left open only the narrow slit in the disk which is required for the passage of the beam deflected by the first pair of plates. This will result in the two decreasing edge fields meeting with a minimum field strength.

In tubes having electrostatic concentration in which the electrical lens is arranged immediately in front of the first pair of plates, there may result additional distortions of the spot (caused by the meeting of the rotational symmetrical lens field with the edge field of the first pair of plates) provided the field strengths of the two joining fields are not small. The lens electrode which is close to the first pair of plates should be combined with the counter-electrode, in order to decrease the lens field towards the pair of plates, as rapidly as possible. The lens electrode will consist of a small short pipe with an approximate diameter equal to the incidence distance of the first pair of plates or the distance apart of the two corresponding counter-electrodes. The small pipe is conveniently made as a direct metallic extension of the first counter-electrode.

The drawing presents a diagrammatic illustration of the subject matter of this invention.

Figure 1 is a side view of a preferred embodiment of my invention.

Figure 2 is a view taken at a right angle to that of Figure 1.

Figure 3 is a plan view taken as indicated by line 3—3 in Figure 1.

Figure 4 is a plan view taken as indicated by line 4—4 in Figure 1.

Figure 5 is a side view showing the embodiment, as shown in Figure 1, applied to a Braun tube.

The deflection system consists of a first pair of deflection plates 1, 2, and a second pair of deflection plates 3, 4. The electrode disk 5, pointing towards the cathode, is arranged on the cathode side of the first pair of deflection plates. Another electrode 6, which is disk shaped, is arranged between the two pairs of plates.

The electrode disk 5 supports two counter-electrodes 7 and 8, shaped as angle pieces. These angle pieces, of rectangular shape, are placed in such a position that their distance apart is equal to the distance separating the first pair of deflection plates at this place. A small short pipe 15 is mounted on the opposite side of disk 5, the diameter of which also corresponds to the distance separating the two angle pieces. At the end of the small pipe follows the last electrode (other than the cathode) of the remaining electrode arrangement. In this case a disk shaped electrode of the electrode arrangement is shown at 16, and a cathode 17 is positioned to supply electrons to pipe 15.

The electrode 6 supports on one side the two angle pieces 9 and 10, the free legs of which are inclined and spaced in such a manner that they are in the approximate extension planes of the first pair of deflection plates. Two rectangular angle pieces 11 and 12 are placed on the other side of electrode 6, with their distance apart corresponding to the smaller opening formed by the second pair of deflection plates. The opening in electrode 6 is shaped as a slit, whose width corresponds to the distance between the two angles 11 and 12. Furthermore, two counter-electrodes 13 and 14, shaped as angles, follow the deflection plates 3 and 4 at the end from which the beam emerges. The inclined legs of the angles here form conveniently, a continuation of the deflection plate planes.

The construction of the various counter-electrodes, and their distances from the deflection plates may be eventually changed according to the particular requirements.

I claim:

1. In a cathode ray tube having a cathode and a gun-type anode cooperating when energized to produce an electron beam, an arrangement of electrodes comprising, in order leading from the gun elements of said tube, a short tubular section positioned symmetrically about the axis of the undeflected ray, a disc connected thereto having a central perforation of the same diameter as said tube, said disc being positioned concentrically about and normal to the said beam axis, a pair of angle plates fixed upon said disc in opposition to said tubular section, said plates being symmetrical about and separated by the width of the central aperture; two rectangular deflecting electrodes positioned symmetrically about said beam axis, having their edges parallel, having one edge of each electrode parallel to and closely adjacent to said angle plates, said parallel edges being separated by a distance equal to that between said angle plates, and the planes of said plates being divergent about said beam axis; a second pair of counter-electrodes comprising obtuse angle plates having bases normal to the ray axis and side terminating edges parallel to and closely adjacent the divergent ends of said deflecting plates, said sides being positioned in the planes of the adjacent deflecting plates; a circular plate affixed to said angle plate bases, said plate having therethrough a slot of width equal to the diameter of said tubular electrode and length equal to the basal separation of said obtuse angle plates and having its length normal to the plane in which said electrodes are divergent; a third pair of counter-electrodes comprising angle plates disposed along the edges of said slot disposed upon the reverse side of said plate, a second set of rectangular deflecting electrodes divergently disposed with an edge of each parallel to and closely adjacent to said last mentioned angle plates and separated by the distance therebetween; and a final set of counter-electrodes comprising obtuse angles symmetrical about the ray axis having bases normal to the ray axis, having sides positioned in the divergent planes of said second deflecting electrodes, having the adjacent edges of said sides parallel to and slightly spaced from the edges of said deflecting plates.

2. In a cathode ray tube, an arrangement of counter-electrodes as described in claim 1, wherein a portion of each counter-electrode forms an approximate continuation of the plane of the adjacent deflecting plate.

ERNST RUSKA.